United States Patent [19]

Westland et al.

[11] Patent Number: 5,206,922
[45] Date of Patent: Apr. 27, 1993

[54] NONLINEAR OPTICAL SWITCH UTILISING ORGANIC CONJUGATED MATERIAL AND FOUR WAVE MIXING TECHNIQUES

[75] Inventors: Duncan J. Westland, Horsell, Woking; Vladimir Skarda, Ashtead, both of England; Werner Blau, Dublin, Ireland; Lorenzo Costa, Sommo, Italy

[73] Assignees: Enichem S.p.A., Milan, Italy; The University of Dublin, Dublin, Ireland

[21] Appl. No.: 576,947

[22] Filed: Sep. 4, 1990

[30] Foreign Application Priority Data

Sep. 4, 1989 [IT] Italy ................ 21611 A/89

[51] Int. Cl.$^5$ ................ G02F 1/35
[52] U.S. Cl. ................ 385/5; 385/122; 385/143; 385/130
[58] Field of Search ................ 307/425–430; 350/96.12, 96.13, 96.14, 96.15, 96.29, 96.30, 96.34; 385/5, 122, 129–131, 141–143; 359/326–332

[56] References Cited

U.S. PATENT DOCUMENTS

| | | | |
|---|---|---|---|
| 4,694,048 | 9/1987 | Choe | 307/425 X |
| 4,707,303 | 11/1987 | Buckley et al. | 307/425 X |
| 4,775,215 | 10/1988 | Teng et al. | 350/96.34 |
| 4,807,968 | 2/1989 | Leslie | 307/425 X |
| 4,824,522 | 4/1989 | Baker et al. | 350/96.12 X |
| 4,887,889 | 12/1989 | Leslie | 307/425 X |
| 4,983,325 | 1/1991 | Choe et al. | 307/425 X |
| 5,064,590 | 11/1991 | Marinaccio | 264/102 |
| 5,119,228 | 6/1992 | Fang | 385/122 X |
| 5,131,068 | 7/1992 | Kanarian et al. | 385/122 X |
| 5,138,686 | 8/1992 | Chikuma et al. | 385/122 |

FOREIGN PATENT DOCUMENTS

0256964 2/1988 European Pat. Off. .

OTHER PUBLICATIONS

"Third-order nonlinear guided-wave optics", SPIE vol. 682, 1986, G. I. Stegeman et al, pp. 179–186.
"Polydiacetylene-Based Directional Couplers and Grating Couplers: Linear and Nonlinear Transmission Properties and All-Optical Switching Phenomena", SPIE vol. 1147, Aug. 10, 1989, P. D. Townsend et al pp. 256–264.

*Primary Examiner*—Brian Healy
*Attorney, Agent, or Firm*—Oblon, Spivak, McClelland, Maier & Neustadt

[57] ABSTRACT

A nonlinear all-optical switching device including a waveguide of an organic conjugated material which forms a nonlinear optical medium. The nonlinear material has an index of refraction which is a function of the local intensity of light. Light beams passing through the waveguide intersect and interact causing diffraction into secondary beams. The intensity of the diffracted beams is a function of the intensity and frequency of the intersecting light beams. The nonlinear material can respond extremely fast and provide a bandwidth exceeding 500 GHz.

13 Claims, 2 Drawing Sheets

NONLINEAR OPTICAL SWITCH UTILISING ORGANIC CONJUGATED MATERIAL AND FOUR WAVE MIXING TECHNIQUES

BACKGROUND OF THE INVENTION

1. Field of the Invention

The present invention relates to a nonlinear all-optical spatial light switch capable of operating at speeds in excess of 100 GHz, and, more particularly, to a switch in which the nonlinear medium includes a conjugated organic material in the form of a waveguide. The switch is controlled by amplitude (time domain) or frequency (frequency domain) modulation of a controlling light beam. The present invention can function as a spatial light switch or as an optical modulator or optical amplifier.

2. Description of the Prior Art

Increased use of optical fibres as a transmission medium in communication networks has resulted in improved communication bandwidths and reduced interference when compared with electronic communication systems.

It has been shown that optical fibres have the capability to transmit data rates ~1 THz as described in the article 'Experimental Observations of picosecond pulse narrowing, and solitons in optical fibres' by L. F. Mollenauer et Al. appearing in *Physical Review Letters* Vol. 45 No. 1, 1980 at pp. 1095-1097.

In order to implement a communication system capable of operating at such data rates it is necessary to have components such as switches and multiplexers/demultiplexers able to operate at similar speeds. It is also clearly preferable to have devices able to operate directly on the light signals themselves, without conversion to another communication medium. Electronic circuits cannot presently operate at 1 THz rates.

Current optical switching devices make use of the fact that at high electric field intensities the polarisation P of certain media is a nonlinear function of the electric field and can be expanded in powers of the electric field E.

$$\frac{P}{\epsilon_o} = X^{(1)}\underline{E} + X^{(2)}\underline{EE} + X^{(3)}\underline{EEE} + \ldots$$

Electro-optic switches currently use materials in which $X^{(2)}$ is not zero and therefore exhibit the Pockels effect whereby an applied electric field alters the refractive index experienced by light propagating through the material. Examples are Gallium Arsenide and Lithium Niobate based devices. Such devices rely on electronic control of light and are limited in practice to speeds below about 10 GHz. They are also expensive to fabricate compared to the present invention.

Devices utilising the third order nonlinear effect $(X^{(3)}>0)$ can directly control light with light via the optical Kerr effect. They rely on the fact that in an optical Kerr medium a light beam can locally alter the refractive index of the medium and influence other light beams. In particular the refractive index of the medium is goverened by $$n = n_0 = n_2 I$$

where I is the local light intensity and $n_2$ and $n_0$ are constants. The constant $n_2$ is related to $X^{(3)}$ in SI units by $$X^{(3)} = n_0 \epsilon_0 c n_2$$

Devices utilising free carrier and exitonic third order nonlinear effects in semiconductors are slow compared to the present invention. There is also the problem that the medium as utilised in such devices is absorptive to light at wavelengths where the device operates.

There remains the need for an optical switch capable of routing light signals in an optical fibre communication system at rates approaching 1 THz, which can also form the switch components in multiplexers/demultiplexers, and can be controlled optically.

SUMMARY OF THE INVENTION

The present invention solves the problems described in the prior art. The invention relates to an all-optical switch including a waveguide formed from a conjugated organic material as a nonlinear optical medium. Conjugated organic materials have been synthesised which are processible and have large third order optical nonlinearities $X^{(3)} > 10^{-10}$ esu. The nonlinearity is very fast and allows operation of devices at frequencies >100 GHz. This is considerably faster than the speed of resonant third order nonlinearities in many inorganic semiconductors e.g. GaAs. At photon energies less than the bandgap energy conjugated organic materials are sufficiently transparent to allow light to propagate for distances in excess of 1 cm in waveguides. Thus large interaction distances can be used to increase the effect of the nonlinearity, waveguiding of light allows long interaction distances.

In the present invention four-wave mixing techniques are used in a waveguide to spatially switch light in frequency and time domains by means of the third order optical nonlinearity of the conjugated organic material. Waveguides are used to confine light to maintain high intensities of light over long distance and increase the effect of $X^{(3)}$.

DETAILED DESCRIPTION

Figure 1:
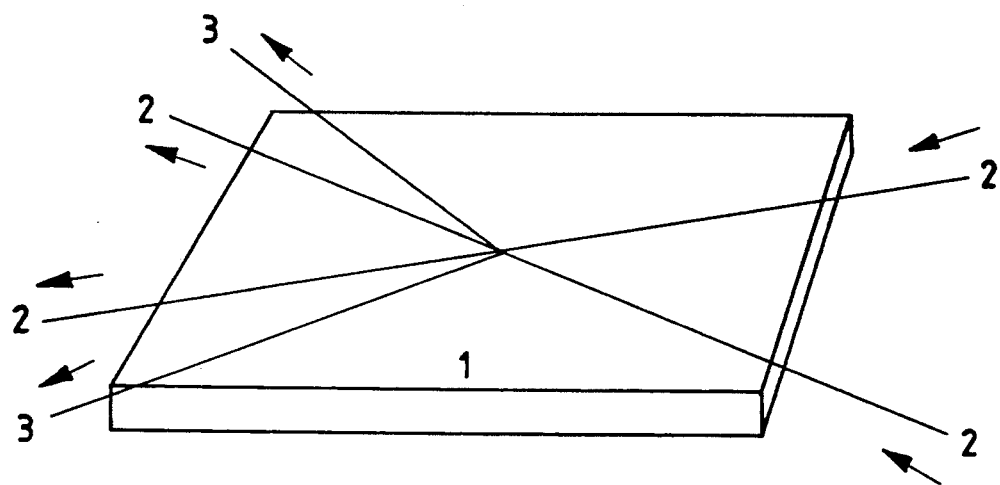
FIG. 1 shows a waveguide of conjugated organic material with an arrangement of interacting light beams propagating within the material.
Figure 2:
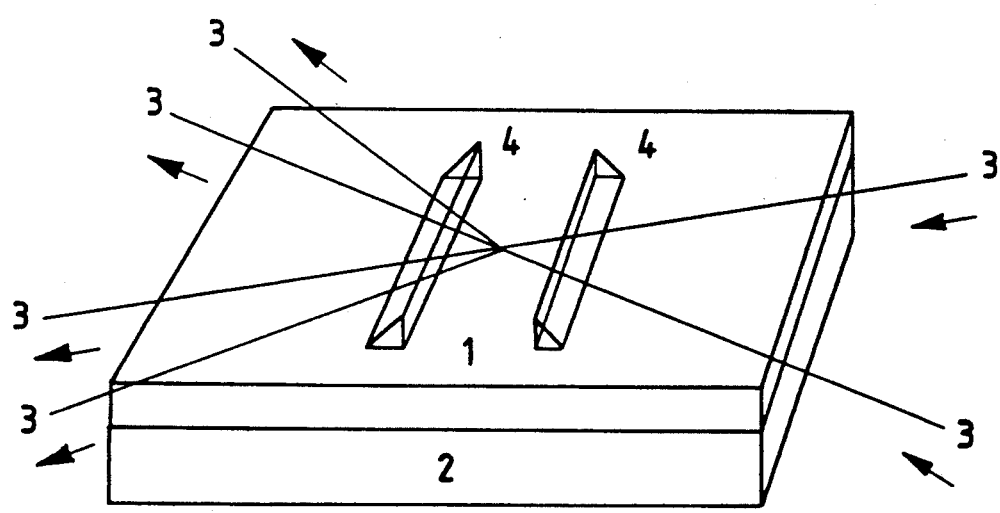
FIG. 2 shows construction of an exemplary optical switching device.
Figure 3:
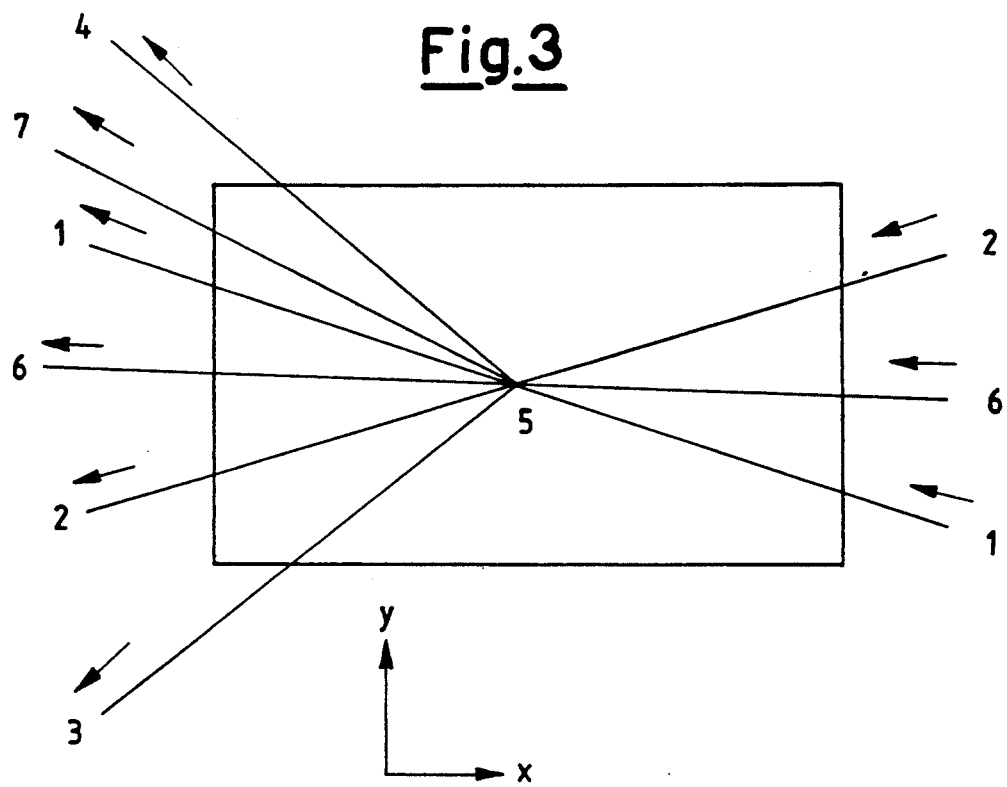
FIG. 3 shows a configuration of light beams suitable for operating a switching device by Forward Degenerate Four-Wave mixing.

The device described in the present invention is typically formed by the deposition of a film of conjugated polymer material (FIG. 2) (1) on a suitable substrate (2) examples of such polymers are poly (3-BCMU) and poly (4-BCMU) which have the structure $$=(CR-C=C-CR)_n=$$

where $$R=(CH_2)_m OCONHCH_2 OCOC_4 H_9$$

and m is 3 for 3-BCMU and 4 for 4-BCMU. They are described in the article 'A-planar-nonplanar conformal transition in conjugated polymer solution' by G. N. Patel in *Journal of Chemical Physics* Vol. 70, pp 4387–4392. The film acts as a waveguiding structure.

Possible methods of deposition include melt and solvent casting, spin casting, and plasma deposition. Rib waveguide structures may be formed by laser or plasma etching a planar film of conjugated material.

One example of a suitable substrate for operation between wavelengths 1 μm–1.6 μm is silica glass. The thickness of the guiding film is typically 0.1–10 μm. Light beams (3) are coupled into and out of the film waveguide by a suitable method, one example being evanescent wave prism coupling via a prism (4), as described in the article 'Theory of the Prism-Film Coupler by Plane-Wave Analyses' by R. Ulrich in the *Journal of the Optical Society of America* vol. 60, number 1.

The waveguiding structure may be alternatively a rib or channel waveguide or waveguides.

Forward degenerate four-wave mixing technique

One possible mode of operation of the switch is termed forward degenerate four-wave mixing. In this scheme the light beams have the configuration shown in FIG. (3), which shows a plane view of the waveguide.

Beams (1) and (2) intersect at point (5) and interfere in such a way that the instantaneous intensity in the y-axis direction is periodic. The conjugated polymer has a refractive index of the form $n = n_0 = n_2 I$ where $n_0$ and $n_2$ are constants and I is the intensity of the light in the polymer. The instantaneous periodic intensity causes a periodic modulation of the refractive index (via the dependence of the refractive index on light intensity) of perodicity Γ given by $$\Gamma = \frac{\lambda}{2} \sin \frac{\theta}{2}$$

where λ is the wavelength of light in the waveguide and θ subtends (1) and (2) at point (5).

The periodic modulation of the refractive index of the conjugated polymer causes light from beam (1) to be diffracted into a secondary beam (4), and light from beam (2) to be diffracted into a secondary beam (3). Absence of beam (1) or beam (2) removes the periodic modulation of the refractive index which enables diffraction of beams (1) and (2). Therefore Beams (3) and (4) are absent. Thus a time domain switching function is implemented.

Further beams (6) may be spatially switched by propagating them through the point of intersection (5). Presence of beams (1) and (2) causes periodic modulation of the refractive index at (5), which diffracts the further beam (6) into secondary beam (7). Absence of beams (1) and (2) causes beam (6) to propagate without diffraction, implementing a spatial switching function by intensity modulation of beams (1) and (2). A spatial switching of beam (6) can also be achieved by frequency modulation of beams (1) and (2) since this alters the spatial frequency of the periodic modulation of the refractive index at (5) and alters the direction of propagation of the diffracted beam (7).

By modulation of the intensity of beams (1) or (2) the intensity of the secondary beams (7) or (3) or (4) can be modulated, enabling the device to be used as a modulator.

If beam (2) is made of greater intensity than beam (1) then beam (4) can be of greater intensity than beam (1) and the device can act as an amplifier for beam (1).

Phase conjugation

Figure 4:
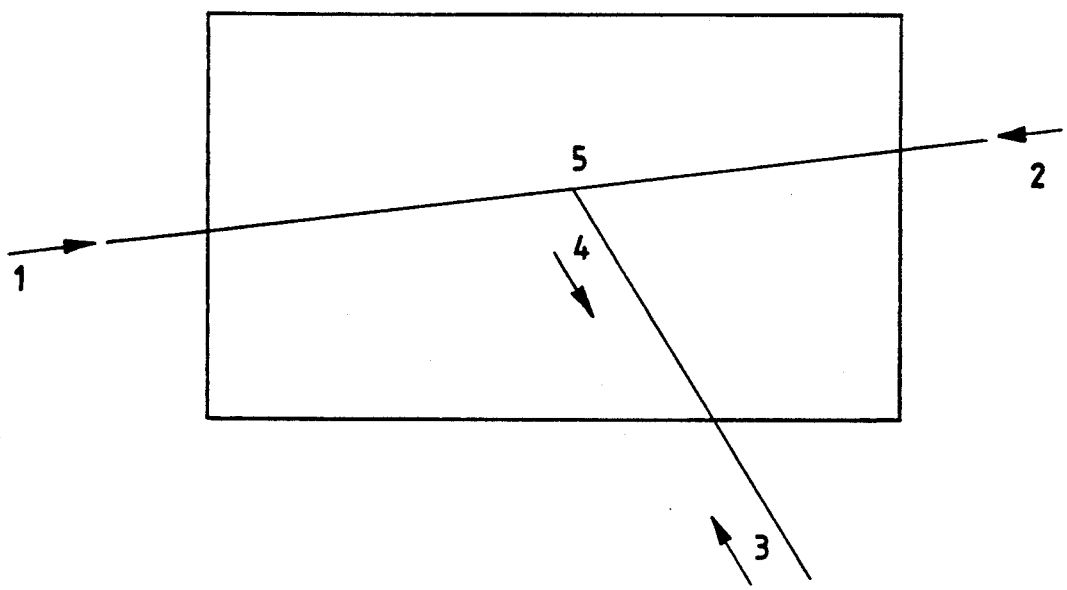
FIG. 4 shows a configuration of light beams suitable for phase conjugation in an optical switching device.

Another possible mode of operation is termed phase conjugation. In this mode of operation the light beams are arranged as shown in FIG. 4

Direction of propagation arrows are shown. Beams (1), (2) and (3) intersect at point (5) and beams (1) and (2) are counterpropagating. Interference between beams (1) and (3), and (2) and (3) causes instantaneously a spatially periodic modulation of the refractive index of the conjugated polymer. The periodic modulation diffracts light from beams (1) and (2) into beam (4), which is the phase conjugate of beam (3).

Modulation of beam (1) or (2) causes modulation of the intensity of beam (4) and as such the device can operate as a modulator.

If beam (1) or beam (2) is more intense than beam (3) this beam (4) can be more intense than beam (3) and the device can act as an amplifier for beam (3).

Description of an Exemplary device

The following describes a switching device fabricated by the inventors which serves as an example of one embodiment of the present invention.

The device includes a planar waveguide formed of gamma-ray polymerised 3-BCMU by spin coating a glass substrate with a solution of the resulting polymer in a mixture of chloroform and DMF solvents. Light beams were coupled into the device via evanescent field coupling using prism couplers. A Nd:glass laser was used as a source of the light beams. The device was operated in forward degenerate four-wave mixing mode and as a phase conjugate reflector.

Device performance parameters are listed in Table 1.

The diffraction efficiency is defined as the intensity of the secondary beams diffracted when the device was used in forward degenerate four wave mixing mode, divided by the total intensity of light entering the device.

TABLE 1

| Performance of exemplary device | |
|---|---|
| guided laser power | 2 W |
| diffraction efficiency*+ | 24% |
| phase conjugate reflectively* | 0.5% |
| speed of operation | >500 GHz |
| laser wavelength | 1058 nm |

*corrected for insertion loss
+forward degenerate four wave mixing mode

TABLE 2

| Properties of some conjugated organic materials | | | |
|---|---|---|---|
| Material | Bandgap | Thermal Stability | $X^{(3)}{}_{esu}$ |
| Polydiacetylenes | | | |
| Poly (3-BCMU) | 1.9 eV | 120° C. | $2 \times 10^{-10}$ |
| Poly (4-BCMU) | 2.2 eV | 120° C. | $2 \times 10^{-10}$ |
| Poly (1-HAU) | 2 eV | 150° C. | — |
| Polythiophenes | | | |
| Poly (Alkoxy-2,5,-thienylene vinylenes) | 1.35 eV | 300° C. | — |
| Poly (3-Alkyl thiophene) | 2 eV | 300° C. | $10^{-11}$ |
| Poly (2,5,dimethoxy-1,4-Phenylene vinylene) | 2 | 350° C. | — |
| Poly (2,5,Thienylene vinylene) | 1.75 eV | 350° C. | — |

In the above table the following symbols for the polydiacetylene (polybutadiyne) substituents are used:

1-HAU=—CH₂OCONHCH₂COOH

3-BCMU=(CH₂)₃OCONHCH₂COOC₄H₉

4-BCMU=(CH₂)₄OCONHCH₂COOC₄H₉

We claim:

1. A waveguide structure for nonlinear optical switching of at least one light beam propagating in a waveguide, comprising:
   a substrate having a first flat surface;
   a film of a conjugated polymer material on said first flat surface, wherein sid conjugated polymer material is a member selected from the group consisting of polydiacetylenes and polythiophenes;
   said film being 0.1 to 10 $\mu$m thick, and having a third order nonlinear optical susceptibility equal to or greater than $10^{-11}$ esu;
   means, including a second light beam intersecting said at least one light beam in an intersection region, for altering the refractive index of material in the intersection region; and
   wherein first and second coherent beams counterpropagate in said film, a third beam spatially overlaps portions of the first and second counterpropagating beams, and a fourth phase conjugate beam diffracted from said third beam counterpropagates along the path of said third beam, the intensity of said fourth beam being a function of the intensities of the first, second and third beams.

2. A switch, according to claim 1, wherein said conjugated polymer is a member selected from the group consisting of polydiacetylenes having a third order nonlinear optical susceptibility greater than $10^{-10}$ esu.

3. A switch, according to claim 2, wherein said conjugated polymer is selected from a member of the group consisting of Poly(3-BCMU) and Poly(4-BCMU).

4. A switch, according to claim 1, 2, or 3, wherein third and fourth diffracted beams are diffracted from first and second spatially overlapping coherent guided light beams in the film, from the region of spatial overlap, the intensity of the diffracted beams being a function of the intensities of the first and second beams.

5. A switch, according to claim 1, 2, or 3, wherein a sixth diffracted beam is diffracted from a fifth beam at a region of spatial overlap of first and second spatially overlapping coherent guided beams with the fifth beam, the intensity of said sixth beam being a function of the intensities and frequencies of the first and second beams.

6. A switch, according to claim 1, 2 or 3, having a bandwidth of greater than 100 GHz.

7. An all-optical switch using a waveguide of an optical material, comprising:
   a substrate having a first flat surface;
   a film of a conjugated polymer material on said first flat surface;
   wherein the conjugated polymer material is a member selected from the group consisting of polydiacetylenes and polythiophenes which have third order nonlinear optical susceptibility equal to or greater than $10^{-11}$ esu and a nonlinear switching frequency response of larger than 500 GHz; and
   wherein said conjugated polymer is a member selected from the group consisting of polythiophenes.

8. An all-optical switch, according to claim 7, wherein said conjugated polymer is a member selected from the group consisting of polydiacetylenes having a third order nonlinear optical susceptibility greater than $10^{-11}$ esu.

9. An all-optical switch, according to claim 8, wherein said conjugated polymer is selected from a member of the group consisting of Poly(3-BCMU) and Poly(4-BCMU).

10. An all-optical switch, according to claim 7, wherein said conjugated polymer is selected from a member of the group consisting of Poly(Alkoxy-2,5-thienylene vinylenes), Poly(3-Alkyl thiophene), Poly(2,5-dimethoxy-1,4-Phenylene vinylene) and Poly(2,5 Thienylene vinylene).

11. An all-optical switch, according to one of claims 7, 8, 9 or 10, wherein third and fourth diffracted beams are diffracted from first and second spatially overlapping coherent guided light beams in the film, from a region of spatial overlap, the intensity of the diffracted beams being a function of the intensities of the first and second beams.

12. An all-optical switch, according to one of claims 7, 8, 9 or 10, wherein a sixth diffraction beam is diffracted from a fifth beam at a region of spatial overlap of first and second spatially overlapping coherent guided beams with the fifth beam, the intensity of said sixth beam being a function of the intensities and frequencies of the first and second beams.

13. An all-optical switch, according to one of claims 7, 8, 9 or 10, wherein first and second coherent beams counter-propagate in said film, a third beam spatially overlaps portions of the first and second counter-propagating beams, and a fourth phase conjugate beam diffracted from said third beam counter-propagates along the path of said third beam, the intensity of said fourth beam being a function of the intensities of the first, second and third beams.

* * * * *